US012690013B2

(12) United States Patent
Han

(10) Patent No.: US 12,690,013 B2
(45) Date of Patent: Jul. 21, 2026

(54) PAGING METHOD AND APPARATUS FOR SATELLITE COMMUNICATION, AND COMPUTER-READABLE STORAGE MEDIUM AND BASE STATION

(71) Applicant: SPREADTRUM COMMUNICATIONS (SHANGHAI) CO., LTD., Shanghai (CN)

(72) Inventor: Lifeng Han, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 375 days.

(21) Appl. No.: 18/551,901

(22) PCT Filed: Dec. 7, 2021

(86) PCT No.: PCT/CN2021/136008
§ 371 (c)(1),
(2) Date: Sep. 22, 2023

(87) PCT Pub. No.: WO2022/199126
PCT Pub. Date: Sep. 29, 2022

(65) Prior Publication Data
US 2024/0179677 A1      May 30, 2024

(30) Foreign Application Priority Data
Mar. 22, 2021      (CN) .......................... 202110302998.0

(51) Int. Cl.
*H04W 68/02*          (2009.01)
*H04B 7/185*          (2006.01)
(Continued)

(52) U.S. Cl.
CPC ........ *H04W 68/02* (2013.01); *H04B 7/18513* (2013.01); *H04W 36/0064* (2023.05); *H04W 36/083* (2023.05)

(58) Field of Classification Search
CPC .............. H04W 68/02; H04W 36/083; H04W 36/0064; H04B 7/18513
See application file for complete search history.

(56) References Cited

U.S. PATENT DOCUMENTS 11,089,571 B2 * 8/2021 Kim .................... H04W 12/084
2017/0230935 A1    8/2017 Xu et al.
(Continued)

FOREIGN PATENT DOCUMENTS

CN          105338519 A        2/2016
CN          109495160 A        3/2019
(Continued)

OTHER PUBLICATIONS

International Search Report for International Application No. PCT/CN2021/136008; Mailing Date, Feb. 15, 2022.
(Continued)

*Primary Examiner* — Natasha W Cosme
*Assistant Examiner* — Benjamin T. Ranew
(74) *Attorney, Agent, or Firm* — CANTOR COLBURN LLP

(57) ABSTRACT

A paging method and apparatus for satellite communication, a computer-readable storage medium and a base station are provided. The paging method includes: receiving a feeder link switch request, wherein the feeder link switch request includes a paging requirement of at least one UE expected to be paged in a target cell; and transmitting a paging message for the at least one UE based on the paging requirement.

17 Claims, 3 Drawing Sheets

(51) Int. Cl.
    *H04W 36/00*        (2009.01)
    *H04W 36/08*        (2009.01)

(56) References Cited

U.S. PATENT DOCUMENTS

| | | | |
|---|---|---|---|
| 2020/0396713 A1 | 12/2020 | Ananda et al. | |
| 2021/0092711 A1* | 3/2021 | Xu | H04W 68/02 |
| 2021/0410198 A1 | 12/2021 | Qiao et al. | |
| 2022/0007328 A1 | 1/2022 | Sun | |
| 2022/0264406 A1* | 8/2022 | Sun | H04W 36/0016 |
| 2024/0031984 A1* | 1/2024 | Li | H04J 11/0076 |

FOREIGN PATENT DOCUMENTS

| | | | |
|---|---|---|---|
| CN | 111182658 A | 5/2020 |
| CN | 111194080 A | 5/2020 |
| CN | 111314953 A | 6/2020 |
| CN | 111314981 A | 6/2020 |
| CN | 111836315 A | 10/2020 |

OTHER PUBLICATIONS

SIPA First Office Action for corresponding CN Application No. 202110302998.0; Issued Mar. 14, 2024; 14 pages.

* cited by examiner a target base station receives a feeder link switch request, wherein the feeder link switch request includes a paging requirement of at least one UE expected to be paged in a target cell — S101 the target base station transmits a paging message for the at least one UE based on the paging requirement — S102

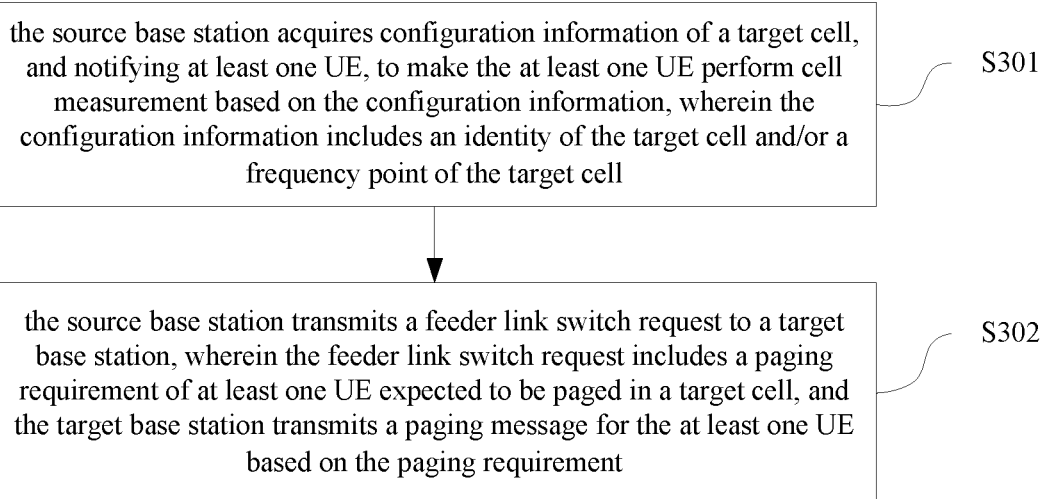

the source base station acquires configuration information of a target cell, and notifying at least one UE, to make the at least one UE perform cell measurement based on the configuration information, wherein the configuration information includes an identity of the target cell and/or a frequency point of the target cell                                                          S301 the source base station transmits a feeder link switch request to a target base station, wherein the feeder link switch request includes a paging requirement of at least one UE expected to be paged in a target cell, and the target base station transmits a paging message for the at least one UE based on the paging requirement                                                          S302

FIG. 3

PAGING METHOD AND APPARATUS FOR SATELLITE COMMUNICATION, AND COMPUTER-READABLE STORAGE MEDIUM AND BASE STATION

CROSS-REFERENCE TO RELATED APPLICATIONS

This is the U.S. national stage of application No. PCT/CN2021/136008, filed on Dec. 7, 2021. Priority under 35 U.S.C. § 119 (a) and 35 U.S.C. § 365 (b) is claimed from Chinese Application No. 202110302998.0, filed Mar. 22, 2021, the disclosure of which is also incorporated herein by reference.

TECHNICAL FIELD

The present disclosure generally relates to communication technology field, and more particularly, to a paging method and apparatus for satellite communication, a computer-readable storage medium and a base station.

BACKGROUND

To solve a coverage problem of a radio communication network to make the 3rd Generation Partnership Project (3GPP) radio communication network cover larger areas, especially vast wild areas, uninhabited areas, etc., to realize IT management and control of these areas, 3GPP has introduced satellite communication Non-Terrestrial access Network (NTN), that is, to achieve large-area coverage through artificial satellites.

At present, NTN has two application modes including a transparent mode and a rebirth mode. In the transparent mode, a signal transmitted by a User Equipment (UE) is forwarded to a ground antenna by a satellite, then sent back to "a base station on the ground" by the ground antenna, and then connected to a data network through UPF. Connection between the UE and the satellite is called a service link, and connection between the satellite and an NTN gateway is called a feeder link. The satellite and NTN gateway do not have any high-layer protocol stack, and merely perform simple signal forwarding. High-layer protocol stacks on the UE side and the base station side are compatible with existing 5th generation mobile networks or 5th generation wireless systems (5G). In the rebirth mode, it is equivalent to placing functions of the base station on the satellite. All processing protocol stacks of the base station are located on the satellite. An interface between the UE and the satellite is equivalent to an interface between the UE and the base station during ground communication. After the base station located on the satellite completes signal processing, the base station transmits data with the NTN gateway on the ground, and then connects to the data network through the UPF. As the transparent mode is easy to implement, compared with an existing terrestrial 3GPP network, only the satellite and the NTN gateway are additionally required without changing other equipment. Therefore, the transparent mode is mostly used in practical operation.

In the transparent mode, as the satellite keeps moving, a distance between the satellite and the NTN gateway on the ground also keeps changing, and attenuation experienced by a wireless signal in the feeder link also keeps changing. When the signal attenuation reaches a certain level, normal data transmission cannot be provided, and feeder link switch is required. That is, the satellite changes an NTN gateway and establishes new feeder link connection. There are two types of feeder link switch including hard switch and soft switch. The hard switch means that the satellite first disconnects from the old NTN gateway, and then establishes the connection with a new NTN gateway. There is a short time period during the switch that the satellite is not connected to any NTN gateway. During this time period, data connection of the UE is actually disconnected. The soft switch means that the satellite first establishes connection with a new NTN gateway, and then disconnects from the old NTN gateway. There is a short time period during the switch that the satellite is connected to the two NTN gateways simultaneously. As the feeder link soft switch does not cause interruption of data transmission, it is more widely applied.

SUMMARY

Embodiments of the present disclosure may ensure consistency of paging before and after feeder link switch.

In an embodiment of the present disclosure, a paging method for satellite communication is provided, including: receiving a feeder link switch request, wherein the feeder link switch request includes a paging requirement of at least one UE expected to be paged in a target cell; and transmitting a paging message for the at least one UE based on the paging requirement.

In an embodiment of the present disclosure, a computer-readable storage medium having computer instructions stored therein is provided, wherein when the computer instructions are executed by a processor, the above method is performed.

In an embodiment of the present disclosure, a base station which includes a memory, and a processor is provided, wherein the memory has computer instructions stored therein, and when the processor executes the computer instructions, the above method is performed.

BRIEF DESCRIPTION OF THE DRAWINGS

FIG. 3 is a flow chart of a paging method for satellite communication according to an embodiment.

DETAILED DESCRIPTION

Figure 1:
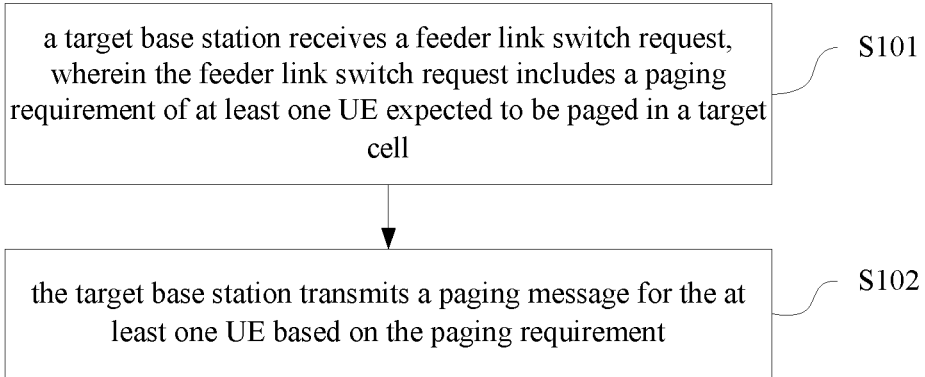
FIG. 1 is a flow chart of a paging method for satellite communication according to an embodiment.

As described in the background, during feeder link switch, broadcast information of a source serving cell and a target cell changes before and after the switch, for example, a TA changes, which makes the UE that was paging before the switch unable to be paged after the switch.

In the exiting techniques, a core network manages a paging process of a UE in units of TA. That is, the core network records the TA (essentially a cell list) where each UE is located, and if the UE has data to arrive, the core network initiates a paging process to all cells in the TA corresponding to the UE. If the UE moves out of a range of the original TA, and learns that a new cell is beyond the range of the original TA by reading broadcast information of the cell (the broadcast information notifies the TA to which the cell belongs), the UE notifies the core network through a TA update process, to make the core network update stored TA information, so that the UE can always be found when data arrives. An NTN cell has a large coverage area which includes a large number of UEs, and an effect of satellite movement is equivalent to that of UE movement. To reduce the TA update process of UEs in the NTN cell, during movement of a satellite cell, the TA is bound to a fixed geographical area, and the satellite updates the TA according to coverage of its own cell during the movement. For example, when a coverage of the satellite cell is within Tracking area 1, the cell broadcasts tracking areal: when the coverage is within Tracking area 2, the cell broadcasts tracking area 2; or when the coverage is at the junction of Tracking area 1 and Tracking area 2, the cell broadcasts Tracking area 1 and Tracking area 2.

Inventors of the present disclosure found that during the feeder link switch procedure, if an area where the feeder link switch occurs is located at the junction of multiple TAs, and TAs corresponding to a source cell and a target cell are different, for example, the source cell corresponds to Tracking Area Identity (TAI) 1 and TAI 2, and the target cell corresponds to TAI 1, the satellite transmits UE paging corresponding to TAI 1 and TAI 2 before the feeder link switch occurs, while a coverage position of the actual satellite cell has not changed much within a switch time of hundreds of milliseconds after the feeder link switch occurs. However, the satellite merely transmits the paging corresponding to TAI 1, and the UE in TAI 2 cannot receive the paging after the feeder link is switched.

In addition, the inventors of the present disclosure also found that after the target base station establishes a transport layer connection with the satellite, the satellite transmits the reference signal of the target cell to the UE, but the UE does not start measurement. Instead, the measurement of the reference signal of the target cell is started after receiving notification from the source base station. Due to a large air interface transmission delay involved in satellite communication, a process of feeder link switch is relatively long.

In the embodiments of the present disclosure, when transmitting the feeder link switch request, the source base station also notifies the target base station of the paging requirement of at least one UE that the source base station expects to page in the target cell, so that the target base station can page following the paging requirement notified by the source base station, which ensures consistency of paging before and after feeder link switch, guarantees smooth operation of calls on the UE, and improves user experience.

Further, compared with exiting techniques where a UE starts measurement after the target base station establishes a transport layer connection with the satellite, in the embodiments of the present disclosure, the source base station notifies the UE to perform measurement before the feeder link switches, so that the UE can start measurement immediately after a reference signal arrives, that is, the measurement can be started in advance, thereby shortening a duration of a feeder link switch procedure and improving switch efficiency.

The technical solutions of the present disclosure can be applied to 5G, 4G or 3G communication systems, and various new communication systems in the future, such as 6G and 7G communication systems.

In order to clarify the objects, characteristics and advantages of the disclosure, embodiments of present disclosure will be described in detail in conjunction with accompanying drawings.

Referring to FIG. 1, FIG. 1 is a flow chart of a paging method for satellite communication according to an embodiment.

In the embodiment, the paging method may be applied to the target base station side, that is, each step of the method may be performed by the target base station. The "target base station" mentioned in the embodiment of the present invention refers to the base station that establishes a new connection with the satellite after the feeder link is switched: A base station that establishes a connection with a satellite.

Specifically, the paging method may include S101 and S102.

In S101, a target base station receives a feeder link switch request, wherein the feeder link switch request includes a paging requirement of at least one UE expected to be paged in a target cell.

In S102, the target base station transmits a paging message for the at least one UE based on the paging requirement.

It should be noted that sequence numbers of steps in the embodiment do not represent a limitation on an execution order of the steps.

The paging method in the embodiment can be used in a flow of soft switch of a feeder link, and can also be used in a flow of hard switch of the feeder link.

It could be understood that, in some embodiments, the paging method may be implemented in a form of a software program which runs in a processor integrated in a chip or a chip module. The method may also be implemented by a combination of software and hardware, which is not limited in the disclosure.

In the embodiments of the present disclosure, the at least one UE expected to be paged in the target cell refers to at least one UE that is being paged or will be paged within a coverage of the source base station.

In some embodiments, in S101, when transmitting the feeder link switch request to the target base station, the source base station carries the paging requirement of the at least one UE expected to be paged in the target cell, so that when receiving the feeder link switch request, the target base station also can learn the UE to which paging needs to be transmitted and the paging requirement of the UE.

In some embodiments, the feeder link switch request further includes information of a satellite connected to a source base station through a feeder link and is used for requesting a target base station to establish a new feeder link with the satellite.

Those skilled in the art should understand that the feeder link switch request is used to request the target base station to establish a new feeder link with the satellite. In the embodiment, an original function of the feeder link switch request is expanded, to make the feeder link switch request possess capability of notifying the paging requirement.

Further, in some embodiments, in S102, the target base station may transmit the paging message for the at least one UE based on the paging requirement.

In some embodiments, the paging requirement may include an identity of a TA to which the at least one UE belongs.

Accordingly, when transmitting paging, the target base station may transmit the paging based on the identity of the TA in the paging requirement, that is, transmitting the paging to UEs corresponding to the identity of the TA in the paging requirement, so as to ensure comprehensiveness of the paging.

In an application scenario, an area where the feeder link switch occurs is located at a junction of multiple TAs, and TAs corresponding to the source cell and the target cell are different. The source cell corresponds to TAI1 and TAI2, and the target cell corresponds to TAI1. Before the feeder link switch occurs, the satellite is transmitting paging to UEs corresponding to TAI1 and TAI2. When the feeder link is switching, the source base station notifies the target base station of the TAI (i.e., TAI1 and TAI2) of the UEs being paged. After the feeder link switch occurs, although the target cell only corresponds to TAI1, the target base station forwards the paging of the UEs corresponding to TAI1 and TAI2 through the satellite, thus, the UEs in TAI1 and TAI2 can receive the paging after the feeder link switch.

In some embodiments, the paging requirement may further include an enhanced coverage parameter which indicates whether the UE needs enhanced coverage.

Accordingly, when transmitting the paging message, in response to the enhanced coverage parameter in the paging requirement being that enhanced coverage is required, the target base station increases a number of transmission times of the paging message for the at least one UE.

In some embodiments, the enhanced coverage parameter may be a Boolean type. If a value of the enhanced coverage parameter is "No", the base station transmitting the paging does not increase the number of transmission times of the paging message: or if the value of the enhanced coverage parameter is "Yes", the base station transmitting the paging increases the number of transmission times of the paging message. A specific number of transmission times of the paging message to be increased may be determined by the source base station and notified to the target base station in advance or may be determined and implemented by the target base station itself, or may be stipulated by a standard, which is not limited in the embodiments of the present disclosure.

In some embodiments, the enhanced coverage parameter may be a specific enhanced coverage target, specifically a preset target value. For example, the enhanced coverage parameter is a required enhanced coverage XdB, and after receiving the enhanced coverage parameter, the target base station determines the increased number of transmission times of the paging message based on the enhanced coverage target value.

In some embodiments, the enhanced coverage parameter may be a specific integer value which is determined by the source base station for each UE that is being paged or will be paged, where the source base station further notifies the target base station to perform paging for a corresponding number of times.

In some embodiments, the enhanced coverage parameter may be an index value which is determined by the source base station for each UE that is being paged or will be paged, where the source base station further notifies the target base station. The target base station determines an increased paging times by looking up a table based on the index value and executes the corresponding times of paging. The table recording index values and corresponding paging times may be preset.

In some embodiments, the paging requirement may further include a paging priority of the at least one UE.

Accordingly, when transmitting the paging message, if the paging requirement includes the paging priority of the at least one UE, the target base station transmits the paging message for the at least one UE based on the paging priority. For example, when there are too many UEs to page, the target base station determines to transmit the paging of the UE with higher priority first based on the paging priority.

In some embodiments, the paging requirement may further include a wake-up signal parameter of the at least one UE.

Accordingly, when transmitting the paging message, if the wake-up signal parameter in the paging requirement is that a wake-up signal is required, the target base station first transmits the wake-up signal for the at least one UE, and then transmits the paging message for the at least one UE.

In some embodiments, the paging requirement may further include one or more of the following: an identity of the at least one UE: capability of the at least one UE to receive paging under various types of communication networks; a paging source of the at least one UE; paging assistance information of the at least one UE; a discontinuous reception cycle of the at least one UE during narrowband Internet of Things paging: or an enhanced coverage parameter of the at least one UE.

In some embodiments, the paging source is selected from a group consisting of AMF trigger and RAN trigger.

In some embodiments, the paging assistance information is selected from a group consisting of an expected number of transmission times for paging, an expected cell for transmitting paging, and expected coverage strength of paging transmission.

In some embodiments, the identity of the UE may be a 5G Temporary Mobile Station Identity (TMSI), an AMF identity (ID), an AMF pool ID, and the like. The capability of the at least one UE to receive paging under various types of communication networks may be whether the UE can receive paging from a New Radio (NR) network, whether the UE can receive paging from a Long Term Evolution (LTE) network, or whether the UE can receive paging from a Narrow Band-Internet of Things (NB-IoT), etc. The discontinuous reception cycle of the at least one UE during narrowband IoT paging may be a time window within which the UE can perform Discontinuous Reception (DRX).

It should be noted that, with development of communication technology, the paging requirement of the UE may also be any other practicable content, which is not limited in the embodiments of the present disclosure.

In some embodiments, the paging method as shown in FIG. 1 may further include: transmitting to an AMF the paging requirement of one or more UEs in the at least one UE, to enable the AMF to update context of a core network.

In some embodiments, the target base station may notify the AMF of the paging requirement received from the source base station. Specifically, the paging requirement received by the target base station from the source base station may be in a form of a list, then the target base station may notify the AMF of the list, or notify the AMF of one or more UEs in the list. After receiving the notification, the AMF updates the UE context saved by the core network. If the UE receives paging from the target base station, the UE may initiate an RRC connection establishment request through the target base station. If the UE receives paging from the source base station, the UE may wait for the feeder link switch and then initiate an RRC connection establishment request through the target base station. Other steps may be referred to existing techniques and are not repeated here.

Figure 2:
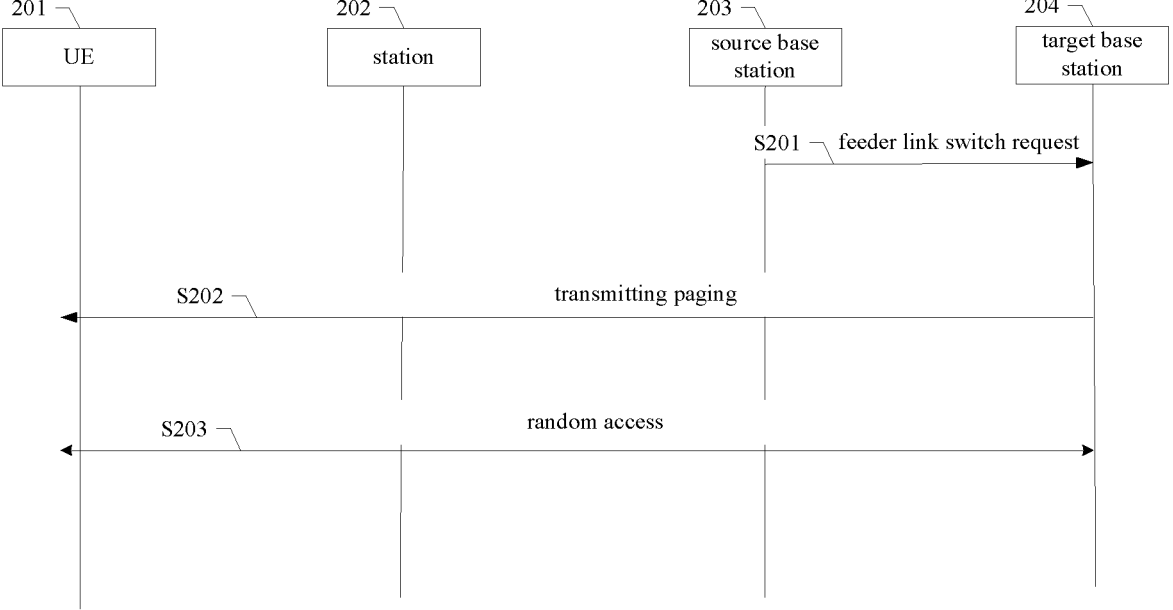
FIG. 2 is a flow chart of a paging method for satellite communication in an application scenario according to an embodiment.

In an application scenario, referring to FIG. 2, FIG. 2 is a flow chart of a paging method for satellite communication in an application scenario according to an embodiment.

In S201, a source base station 203 transmits a feeder link switch request to a target base station 204, wherein the feeder link switch request includes a paging requirement of at least one UE expected to be paged in a target cell.

Afterwards, the target base station 204 may establish a transport layer connection with a station 202 (i.e., a satellite).

In S202, the target base station 204 transmits paging to a UE 201, wherein the target base station 204 transmits a paging message corresponding to UEs on an air interface based on a UE identity in the paging requirement. In addition, the target base station 204 performs differentiating processing based on the paging requirement of each UE.

In S203, the UE 201 performs random access with the target base station 204.

It should be noted that steps after the random access may be referred to the exiting technique and are not repeated here.

Referring to FIG. 3, an embodiment of the present disclosure further discloses another paging method for satellite communication. The paging method for satellite communication may be applied to a source base station side, that is, a source base station performs each step of the method.

Specifically, the paging method may include S301 and S302.

In S301, the source base station acquires configuration information of a target cell, and notifying at least one UE, to make the at least one UE perform cell measurement based on the configuration information, wherein the configuration information includes an identity of the target cell and/or a frequency point of the target cell.

In the embodiment, notifying the UE of the configuration information of the target cell is performed prior to transmitting a feeder link switch request. This means that the UE knows the configuration information of the target cell in advance, so that the UE can start measurement immediately after arrival of the reference signal. In the exiting techniques, measurement is started after a target base station establishes a transport layer connection with a satellite and transmits a reference signal which is then transmitted to a UE via a satellite, and a source base station notifies the UE to measure the reference signal sent by the target base station. However, the step of the source base station notifying the UE to measure the reference signal sent by the target base station requires a long transmission delay. In the embodiments of the present disclosure, the measurement can be started in advance, thereby shortening a duration of a feeder link switch procedure and improving switch efficiency.

In some embodiments, the configuration information further includes an SSB sequence and/or SSB configuration information of the target cell.

In some embodiments, the source base station acquires the configuration information of the target cell through a network management platform, a network management entity and/or a third-party configuration entity: or acquires a configuration information list through a network management platform, a network management entity and/or a third-party configuration entity, and selects the configuration information from the configuration information list, wherein the configuration information list includes a plurality of sets of configuration information.

Alternatively, the source base station acquires information such as a cell identity, a frequency point, an SSB sequence, and a basic SSB configuration of the target cell by interacting with the target base station in advance. That is, the source base station interacts with the target base station to acquire the above configuration information before the feeder link switch.

In some embodiments, the source base station may transmit the above configuration information to the UE via one or more forms of RRC signaling, a Media Access Control (MAC) control unit, a Packet Data Convergence Protocol (PDCP) control unit, or a Radio Link Control (RLC) control unit.

In some embodiments, the source base station may determine time length of a delay and notify the at least one UE of the configuration information together with the time length of the delay, to make the at least one UE perform cell measurement based on the configuration information after the delay.

Specifically, the source base station may notify the UE of information about a duration of a timer. After receiving the information, the UE starts a timer based on the configured duration. After the timer expires, the UE starts to measure a reference signal of the target cell.

In S302, the source base station transmits a feeder link switch request to a target base station, wherein the feeder link switch request includes a paging requirement of at least one UE expected to be paged in a target cell, and the target base station transmits a paging message for the at least one UE based on the paging requirement.

In some embodiments, the feeder link switch request may merely include information about a satellite connected to the source base station through a feeder link and is used for requesting the target base station to establish a new feeder link with the satellite. That is to, the source base station first notifies the UE of the configuration information of the target cell, and then transmits the feeder link switch request.

Figure 4:
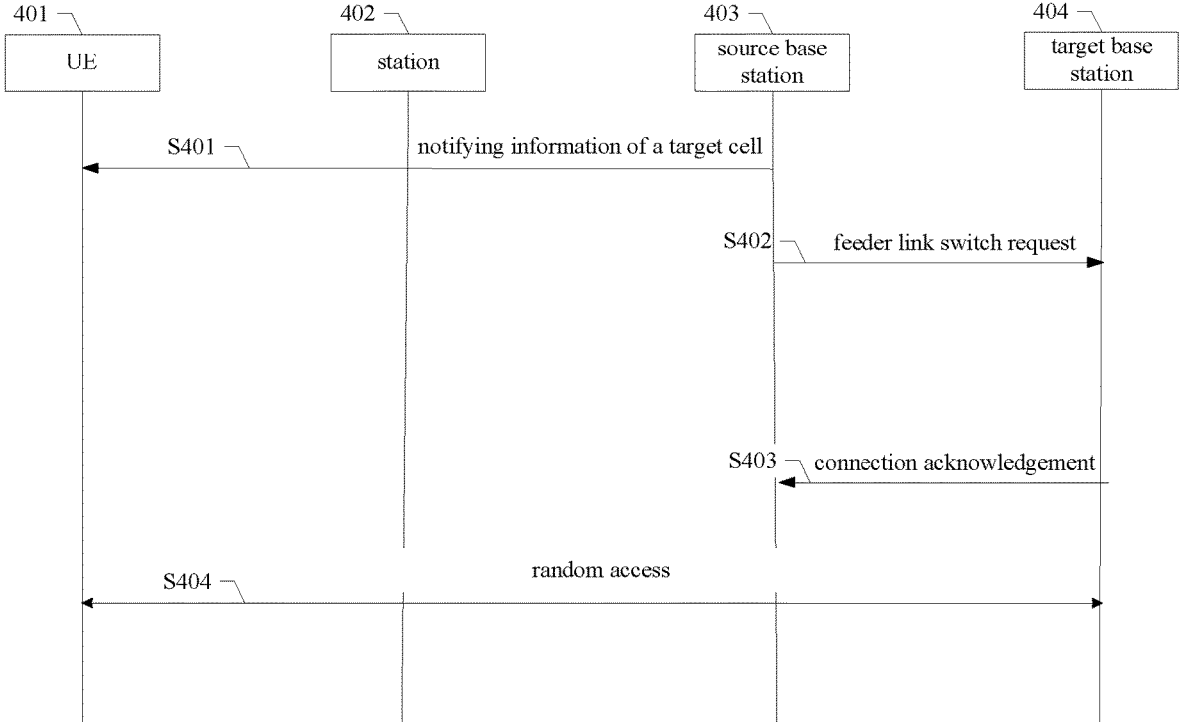
FIG. 4 is a flow chart of a paging method for satellite communication in an application scenario according to an embodiment.

In an application scenario, referring to FIG. 4, FIG. 4 is a flow chart of a paging method for satellite communication in an application scenario according to an embodiment.

In S401, a source base station 403 notifies a UE 401 of configuration information of a target cell.

In S402, the source base station 403 transmits a feeder link switch request to a target base station 404. The feeder link switch request may only include information of a satellite connected to the source base station 403 through a feeder link or include both the information of the satellite connected to the source base station 403 through the feeder link and a paging requirement of at least one UE expected to be paged in a target cell. Afterwards, the target base station 404 establishes a transport layer connection with a station 402 (i.e., the satellite).

In S403, the target base station 404 transmits a connection acknowledgement to the source base station 403. If in S401, the source base station 403 acquires the configuration information by interacting with a network management platform, a network management entity, a third-party configuration entity or the target base station in advance, and the target cell does not modify the configuration information, S404 may be omitted.

In S404, the UE 401 performs random access with the target base station 204.

It should be noted that a sequence number of each step in the embodiment does not represent a limitation on an execution order of each step. For example, S401 may be performed prior to S402 or following S402.

In the exiting techniques, the source base station 403 notifies the UE 401 to perform measurement after S404, and the UE actually performs the measurement after receiving the notification. However, in the embodiments of the present disclosure, the source base station 403 notifies the UE 401 to perform measurement in S401, and the UE can actually perform the measurement after S403. From above, compared with the exiting techniques, in the embodiments of the present disclosure, during the feeder link switch, timing of UE performing measurement is advanced, so that timing of switch completion is also advanced, which may shorten a switch procedure.

It should be noted that the target base station transmits the paging message only after the UE measures the reference signal of the target cell and finds the target cell. That is, if the source base station notifies the UE in advance to measure the reference signal of the target cell (i.e., S401 in FIG. 4), the target cell may transmit paging after the notification. If the source base station does not notify the UE in advance to measure the reference signal of the target cell, the target cell should transmit the paging after the UE is notified of measurement.

Figure 5:
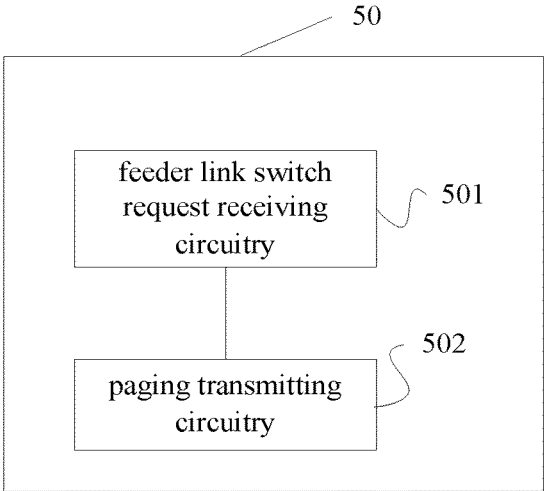
FIG. 5 is a structural diagram of a paging apparatus for satellite communication according to an embodiment.

Referring to FIG. 5, FIG. 5 is a structural diagram of a paging apparatus 50 for satellite communication according to an embodiment. The apparatus 50 includes a feeder link switch request receiving circuitry 501 and a paging transmitting circuitry 502.

The feeder link switch request receiving circuitry 501 is configured to receive a feeder link switch request, wherein the feeder link switch request includes a paging requirement of at least one UE expected to be paged in a target cell.

The paging transmitting circuitry 502 is configured to transmit a paging message for the at least one UE based on the paging requirement.

In the embodiments of the present disclosure, when transmitting the feeder link switch request, the source base station also notifies the target base station of the paging requirement of at least one UE that the source base station expects to page in the target cell, so that the target base station can page following the paging requirement notified by the source base station, which ensures consistency of paging before and after feeder link switch, guarantees smooth operation of calls on the UE, and improves user experience.

In an embodiment of the present disclosure, a paging apparatus for satellite communication is provided, including: a feeder link switch request transmitting circuitry configured to transmit a feeder link switch request to a target base station, wherein the feeder link switch request includes a paging requirement of at least one UE expected to be paged in a target cell, and the target base station transmit a paging message for the at least one UE based on the paging requirement.

In an embodiment of the present disclosure, another paging apparatus for satellite communication is provided, including: configuration information notifying circuitry configured to acquire configuration information of a target cell, and notify at least one UE, to make the at least one UE perform cell measurement based on the configuration information, wherein the configuration information includes an identity of the target cell and/or a frequency point of the target cell.

Compared with exiting techniques where a UE starts measurement after a target base station establishes a transport layer connection with a satellite, in the embodiments of the present disclosure, the source base station notifies the UE to perform measurement before the feeder link switches, so that the UE can start measurement immediately after a reference signal arrives, that is, the measurement can be started in advance, thereby shortening a duration of a feeder link switch procedure and improving switch efficiency.

More details of working principles and working modes of the paging apparatus for satellite communication can be referred to related descriptions in FIG. 1 to FIG. 4 and are not repeated here.

The paging apparatus for satellite communication may be a chip or a chip module.

Each module/unit of each apparatus and product described in the above embodiments may be a software module/unit or a hardware module/unit or may be a software module/unit in part, and a hardware module/unit in part. For example, for each apparatus or product applied to or integrated in a chip, each module/unit included therein may be implemented by hardware such as circuits: or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a computer-readable storage medium having computer instructions stored therein is provided, wherein when the computer instructions are executed, the paging method as shown in FIG. 1, FIG. 2, FIG. 3, or FIG. 4 is performed. In some embodiments, the storage medium may include a ROM, a RAM, a magnetic disk or an optical disk. In some embodiments, the storage medium may include a non-volatile or a non-transitory memory.

In an embodiment of the present disclosure, a UE including a memory and a processor is provided, wherein the memory has computer instructions stored therein, and when the processor executes the computer instructions, the paging method as shown in FIG. 1, FIG. 2, FIG. 3, or FIG. 4 is performed. The UE may include but not limited to a mobile phone, a computer or a tablet computer.

The technical solutions of the present disclosure also may be applied to different network architectures, including but not limited to a relay network architecture, a dual-link architecture, and a vehicle-to-everything architecture.

In the embodiments of the present disclosure, a core network may be an Evolved Packet Core (EPC), 5G Core Network or a new core network in future communication systems. The 5G Core Network is composed of a set of devices, implements Access and Mobility Management Function (AMF) providing functions such as mobility management function, User Plane Function (UPF) providing functions such as packet routing and forwarding and Quality of Service (QoS) management, and Session Management Function (SMF) providing functions such as session management and IP address allocation and management. The EPC may consist of an MME that provides functions such as mobility management and gateway selection, a Serving Gateway (S-GW) that provides functions such as packet forwarding, and a PDN Gateway (P-GW) that provides functions such as terminal address allocation and rate control.

The base station in the embodiments of the present disclosure may also be referred to as a base station equipment, and is a device deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The base station controller in the embodiments of the present disclosure is a device for managing base stations, such as a Base Station Controller (BSC) in a 2G network, a Radio Network Controller (RNC) in a 3G network, or a device that controls and manages a base station in a new communication system in the future.

The network in the embodiments of the present disclosure refers to a communication network that provides communication services for terminals, including a base station of a radio access network, a base station controller of a radio access network, and a device on a core network side.

A terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

In the embodiments of the present disclosure, a unidirectional communication link from an access network to a terminal is defined as a downlink, data transmitted on the downlink is downlink data, and a transmission direction of the downlink data is called a downlink direction. Besides, a unidirectional communication link from a terminal to an access network is defined as an uplink, data transmitted on the uplink is uplink data, and a transmission direction of the uplink data is called an uplink direction.

It should be understood that the term "and/or" in the present disclosure is merely an association relationship describing associated objects, indicating that there can be three types of relationships, for example, A and/or B can represent "A exists only, both A and B exist, B exists only.

In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general-purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A paging method for satellite communication, comprising:
   receiving a feeder link switch request, wherein the feeder link switch request comprises a paging requirement of at least one User Equipment (UE) expected to be paged in a target cell; and
   transmitting a paging message for the at least one UE based on the paging requirement;
   wherein the paging requirement comprises paging assistance information of the at least one UE, and the paging assistance information is selected from a group consisting of an expected number of transmission times for paging, an expected cell for transmitting paging, and expected coverage strength of paging transmission.

2. The paging method according to claim 1, wherein the paging requirement further comprises one or more of the following:
   an identity of the at least one UE;
   an identity of a tracking area to which the at least one UE belongs;
   a paging priority of the at least one UE;
   capability of the at least one UE to receive paging under various types of communication networks;
   a paging source of the at least one UE;
   a discontinuous reception cycle of the at least one UE during narrowband Internet of Things paging;
   an enhanced coverage parameter of the at least one UE; or
   a wake-up signal parameter of the at least one UE.

3. The paging method according to claim 2, wherein the paging source is selected from a group consisting of Access and Mobility management Function (AMF) trigger and Radio Access Network (RAN) trigger.

4. The paging method according to claim 2, wherein said transmitting the paging message for the at least one UE based on the paging requirement comprises:
   in response to the paging requirement comprising the paging priority of the at least one UE, transmitting the paging message for the at least one UE based on the paging priority;
   in response to the enhanced coverage parameter in the paging requirement being that enhanced coverage is required, increasing a number of transmission times of the paging message for the at least one UE; or
   in response to the wake-up signal parameter in the paging requirement being that a wake-up signal is required, transmitting the wake-up signal for the at least one UE, and then transmitting the paging message for the at least one UE.

5. The paging method according to claim 1, further comprising:
   transmitting to an AMF the paging requirement of one or more UEs in the at least one UE, to enable the AMF to update context of a core network.

6. The paging method according to claim 1, wherein the feeder link switch request further comprises information of a satellite connected to a source base station through a feeder link, and is used for requesting a target base station to establish a new feeder link with the satellite.

7. A non-transitory computer-readable storage medium storing one or more programs, the one or more programs comprising computer instructions, which, when executed by a processor, cause the processor to:
   receive a feeder link switch request, wherein the feeder link switch request comprises a paging requirement of at least one User Equipment (UE) expected to be paged in a target cell; and
   transmit a paging message for the at least one UE based on the paging requirement;
   wherein the paging requirement comprises paging assistance information of the at least one UE, and the paging assistance information is selected from a group consisting of an expected number of transmission times for paging, an expected cell for transmitting paging, and expected coverage strength of paging transmission.

8. A base station, comprising a memory and a processor, wherein the memory stores one or more programs, the one or more programs comprising computer instructions, which, when executed by the processor, cause the processor to:

receive a feeder link switch request, wherein the feeder link switch request comprises a paging requirement of at least one User Equipment (UE) expected to be paged in a target cell; and transmit a paging message for the at least one UE based on the paging requirement;

wherein the paging requirement comprises paging assistance information of the at least one UE, and the paging assistance information is selected from a group consisting of an expected number of transmission times for paging, an expected cell for transmitting paging, and expected coverage strength of paging transmission.

9. The base station according to claim 8, wherein the paging requirement further comprises one or more of the following:

an identity of the at least one UE;

an identity of a tracking area to which the at least one UE belongs;

a paging priority of the at least one UE;

capability of the at least one UE to receive paging under various types of communication networks;

a paging source of the at least one UE;

a discontinuous reception cycle of the at least one UE during narrowband Internet of Things paging;

an enhanced coverage parameter of the at least one UE; or a wake-up signal parameter of the at least one UE.

10. The base station according to claim 9, wherein the paging source is selected from a group consisting of Access and Mobility management Function (AMF) trigger and Radio Access Network (RAN) trigger.

11. The base station according to claim 9, wherein the processor is further caused to:

in response to the paging requirement comprising the paging priority of the at least one UE, transmit the paging message for the at least one UE based on the paging priority;

in response to the enhanced coverage parameter in the paging requirement being that enhanced coverage is required, increase a number of transmission times of the paging message for the at least one UE; or in response to the wake-up signal parameter in the paging requirement being that a wake-up signal is required, transmit the wake-up signal for the at least one UE, and then transmit the paging message for the at least one UE.

12. The base station according to claim 8, wherein the processor is further caused to:

transmit to an AMF the paging requirement of one or more UEs in the at least one UE, to enable the AMF to update context of a core network.

13. The base station according to claim 8, wherein the feeder link switch request further comprises information of a satellite connected to a source base station through a feeder link, and is used for requesting a target base station to establish a new feeder link with the satellite.

14. The non-transitory computer-readable storage medium according to claim 7, wherein the paging requirement further comprises one or more of the following:

an identity of the at least one UE;

an identity of a tracking area to which the at least one UE belongs;

a paging priority of the at least one UE;

capability of the at least one UE to receive paging under various types of communication networks;

a paging source of the at least one UE;

a discontinuous reception cycle of the at least one UE during narrowband Internet of Things paging;

an enhanced coverage parameter of the at least one UE; or a wake-up signal parameter of the at least one UE.

15. The non-transitory computer-readable storage medium according to claim 14, wherein the paging source is selected from a group consisting of Access and Mobility management Function (AMF) trigger and Radio Access Network (RAN) trigger.

16. The non-transitory computer-readable storage medium according to claim 14, wherein the processor is further caused to:

in response to the paging requirement comprising the paging priority of the at least one UE, transmit the paging message for the at least one UE based on the paging priority;

in response to the enhanced coverage parameter in the paging requirement being that enhanced coverage is required, increase a number of transmission times of the paging message for the at least one UE; or in response to the wake-up signal parameter in the paging requirement being that a wake-up signal is required, transmit the wake-up signal for the at least one UE, and then transmit the paging message for the at least one UE.

17. The non-transitory computer-readable storage medium according to claim 7, wherein the processor is further caused to:

transmit to an AMF the paging requirement of one or more UEs in the at least one UE, to enable the AMF to update context of a core network.

* * * * *